Nov. 8, 1966 J. P. ECKERT, JR., ET AL 3,284,635

PARAMETRIC ELECTRONIC DEVICE

Filed Nov. 30, 1962 2 Sheets-Sheet 1

INVENTORS
ROBERT A. BRINKER
ALBERT BROWN
JOHN PRESPER ECKERT
LEONARD R. HULLS

BY Fred Fisher
ATTORNEY

United States Patent Office 3,284,635

Patented Nov. 8, 1966

3,284,635

PARAMETRIC ELECTRONIC DEVICE

John Presper Eckert, Jr., Gladwynne, Albert Brown, Philadelphia, Leonard R. Hulls, Gwynedd Valley, and Robert A. Brinker, Philadelphia, Pa., assignors to Sperry Rand Corporation, New York, N.Y., a corporation of Delaware Filed Nov. 30, 1962, Ser. No. 241,286
7 Claims. (Cl. 307—88)

This invention relates to parametric electronic devices, and in particular relates to such devices which are useful as oscillators, amplifiers, and memories.

In the electronic data processing field, information including instructions and data can be represented by pluralities of binary digits. A binary digit is expressed, in conventional notation, as a "1" or a "0."

Binary information can be represented in computers by an instantaneous condition, by a steady state condition, or by a combination of both. A "1" or "0," either instantaneously or steady state, can be represented by (1) the presence of a pulse or voltage level, or absence of a pulse or voltage level, (2) the presence of one phase of oscillation or the presence of a second phase of oscillation, (3) the presence of oscillation or the absence of oscillation, or (4) other dual conditions, including but not limited to the states of magnetic cores, etc.

This invention is primarily concerned with that area of electronic data processing wherein binary information is represented by the presence of oscillation or the absence of oscillation.

In the past oscillators, amplifiers, and memories have utilized active elements such as vacuum tubes and transistors. However, through the use of magnetically saturable elements, such as thin magnetic films, such devices can be constructed utilizing fewer components, have higher efficiencies, faster turn-on time, and be more economical than many corresponding devices of the prior art.

It is, therefore, an object of this invention to provide novel oscillators, amplifiers, and memories.

Another object of this invention is to provide a novel parametric oscillator suitable for representing digital information.

Still another object of this invention is to provide a novel parametric amplifier which is sensitive to small signals.

Yet another object of this invention is to provide a novel parametric memory.

In accordance with one embodiment of this invention, a magnetically saturable element, preferably having a substantially rectangular hysteresis characteristic, is coupled to receive a D.C. bias source and a pump source having a fixed frequency. An output winding of the element is coupled with a capacitor to form a circuit tuned to the fixed frequency. A small signal source is coupled to the tuned circuit to initiate oscillations therein.

The D.C. bias source is coupled to the magnetic element, which may be a ferrite core, thin film, or the like, in such a maner so as to cause the element to be driven to its saturated condition. The pump source is of relatively high value but normally insufficient to cause the element to be driven out of its saturated condition.

When a signal source is applied to the tuned circuit, coincidentally with the pump source, and in phase therewith, the total energy added to the circuit is sufficient to drive the element out of saturation. The energy induced in the output winding is transferred to the capacitor and back to the output winding; oscillation occurs in the circuit and remains after the signal is removed. The tuned circuit continues to oscillate until the pump source is removed, at which time oscillation halts.

In another embodiment of this invention, a non-rectangular hysteresis characteristic element can be used together with a compensating circuit coupled between the pump source and the tuned circuit to cancel induced signals caused by the non-rectangularity of the element.

Other objects and advantages of this invention, together with its construction and mode of operation, will become more apparent from the following description, when read in conjunction with the accompanying drawings, in which like reference symbols refer to like components, and in which:

FIG. 4A is a waveform of the equivalent current provided by the signal source; and FIG. 4C is a waveform of the output signal.

Figure 1:
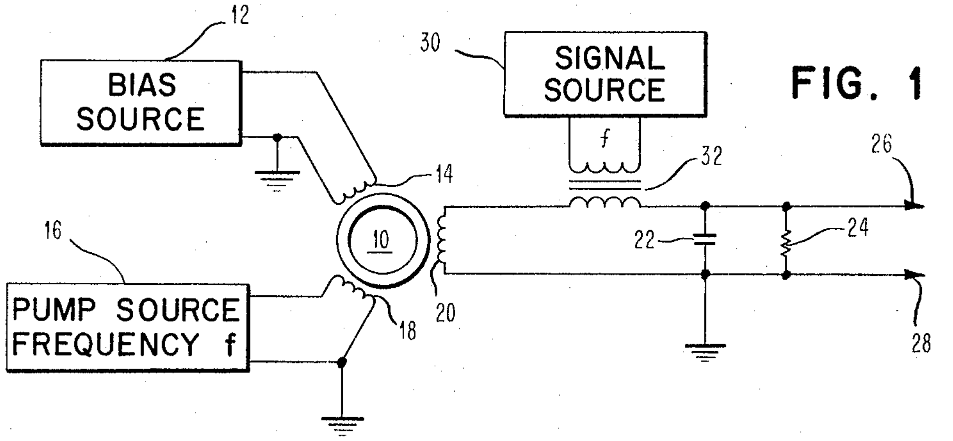
FIG. 1 is a schematic of one embodiment of this invention.
Figure 2:
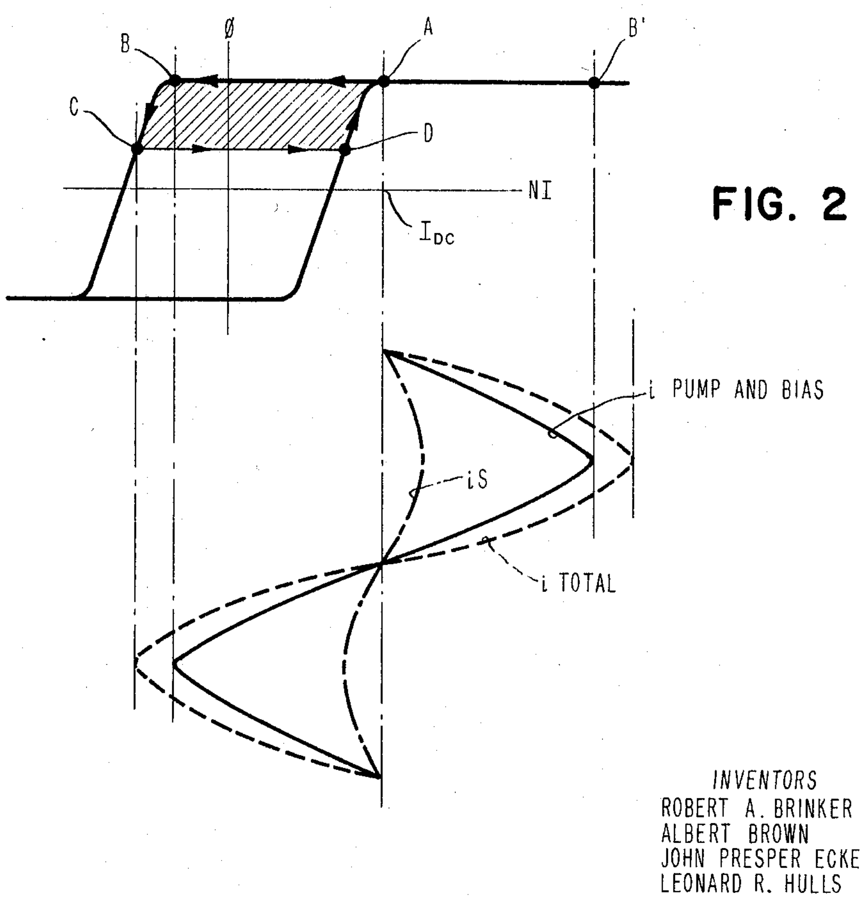
FIG. 2 is a set of electrical diagrams and a hysteresis characteristic for the embodiment shown in FIG. 1.

Referring to FIG. 1, there is illustrated a magnetically saturable element 10, which can be a ferrite core, a thin magnetic film, or other element which has a substantially rectangular hysteresis characteristic as shown in FIG. 2.

A bias source 12, which provides a current, $I_{dc}$, is coupled to a winding 14 which is coupled to the magnetic element 10. The current $I_{dc}$ together with the number of turns on winding 14 is of sufficient magnitude to drive the element 10 to a saturated condition, as represented by the letter A in FIG. 2.

A pump source 16, which provides a clocked alternating current of a fixed frequency *f*, is coupled to the magnetic element 10 by a suitable means, as for example, the winding 18. The pump source 16, together with the bias source 12, effectively provide a current coupled to the element 10, as shown in FIG. 2. The pump source is alternately turned on and off by a suitable clock source (not shown).

The peak value of the pump source 16, although exceeding the amount of the bias level, is insufficient to de-saturate the magnetic element 10. When the pump source swings in a direction opposite to the polarity of the bias, the element 10 operates towards the point B of the hysteresis characteristic, as shown in FIG. 2. The flux at points B and B′ is substantially the same as the flux at point A, since all points, A, B and B′ lie on the low $d\phi/d(NI)$ portion of the hysteresis characteristic.

An output winding 20 couples the magnetic element 10 to a capacitor 22 to form a tuned circuit. A load resistor 24 can be applied across the tank circuit 20–22, and output signals can be obtained from output terminals 26, 28 across the load resistor 24. The tuned circuit is resonant at the frequency *f* at the quiescent condition of D.C. bias, but no A.C. pump signal. The resonant frequency, during application of the pump signal is only slightly detuned.

A signal source 30, which is adapted to apply a small signal of several cycles at the frequency $f$ as shown in FIG. 4B, is coupled to the tank circuit 20–22 by any suitable means, such as, for example, a transformer 32. The signal from the signal source 30, being in phase with the pump and acting cojointly with the pump source 16, is sufficient to de-saturate the element 10 to the point C, as shown in FIG. 2. The saturable element 10 then operates along the minor hysteresis loop ABCD as shown in FIG. 2.

Referring to FIGS. 4A, 4B, and 4C waveforms are illustrated, showing conditions during oscillation and non-oscillation.

FIG. 4A is a waveform illustrating the effective current of the bias source and the pump source. The steady state bias source is maintained at $I_{dc}$. The pump source is an alternating current source that can be clocked on and off. As shown in FIG. 4A, fourteen cycles of oscillation of the pump source are shown, seven cycles of non-oscillation, then fourteen cycles of oscillation, etc. The selection of 14 and 7 cycles, or the ratio of 2:1, on-off time is shown for illustrative purposes only, and is not meant to limit this invention.

As the pump source 16 oscillates, with no signal from the signal source 30, the element 10 operates between the points A and B, and to the point B′, as shown in FIG. 2. Since the element 10 operates along a low $d\phi/dI$ portion of its hysteresis characteristic, substantially no current is induced in the output winding 20, and, hence, the current flow in the tuned circuit 20–22, and the voltage across the output resistor 24 is substantially nil.

Thus, with the pump source 16 on, with no signal from the signal source 30, on oscillation occurs in the output circuit 20–22; no output signal is produced; a "zero" is indicated by the non-oscillation condition of the tuned circuit 20–22.

Upon application of a signal from the signal source 30, coincidentally with pump source oscillation, additional energy is added to the circuit causing the element to traverse a minor hysteresis loop ABCD. The change in flux towards point C, and from D to A is fairly rapid. This large $d\phi/d(NI)$ ratio induces a substantial output signal across the output winding 20, which signal is magnified due to the tuned condition of the tank circuit 20–22. Upon removal of the signal from the signal source 30, the pump source 16 continues to provide energy to the element 10, together with the energy stored in the capacitor 22 and oscillation in the tuned circuit 20–22 continues indefinitely. Upon removal of the pump source, with no additional energy supplied to the tuned circuit 20–22, oscillation in the output circuit ceases due to dissipation across the load resistor 24.

The circuit acts as a controlled oscillator in that oscillation occurs in the tank circuit 20–22 during the presence of the pump signal after application of the signal provided by the signal source 30. The output signal across the load resistor 24 is substantially greater than the input signal from the signal source, thus providing amplification.

During presence of the pump source, a "one" can be "written" into the tuned circuit by the application of the input signal from the signal source 30. When the input signal is removed, the tuned circuit "remembers" and continues to oscillate. The "one" can be "erased" from the tuned circuit 20–22 by simply terminating the pump source.

Thus, there has been described an embodiment of this invention which operates as an oscillator, an amplifier, and as a memory.

Figures 3, 4:
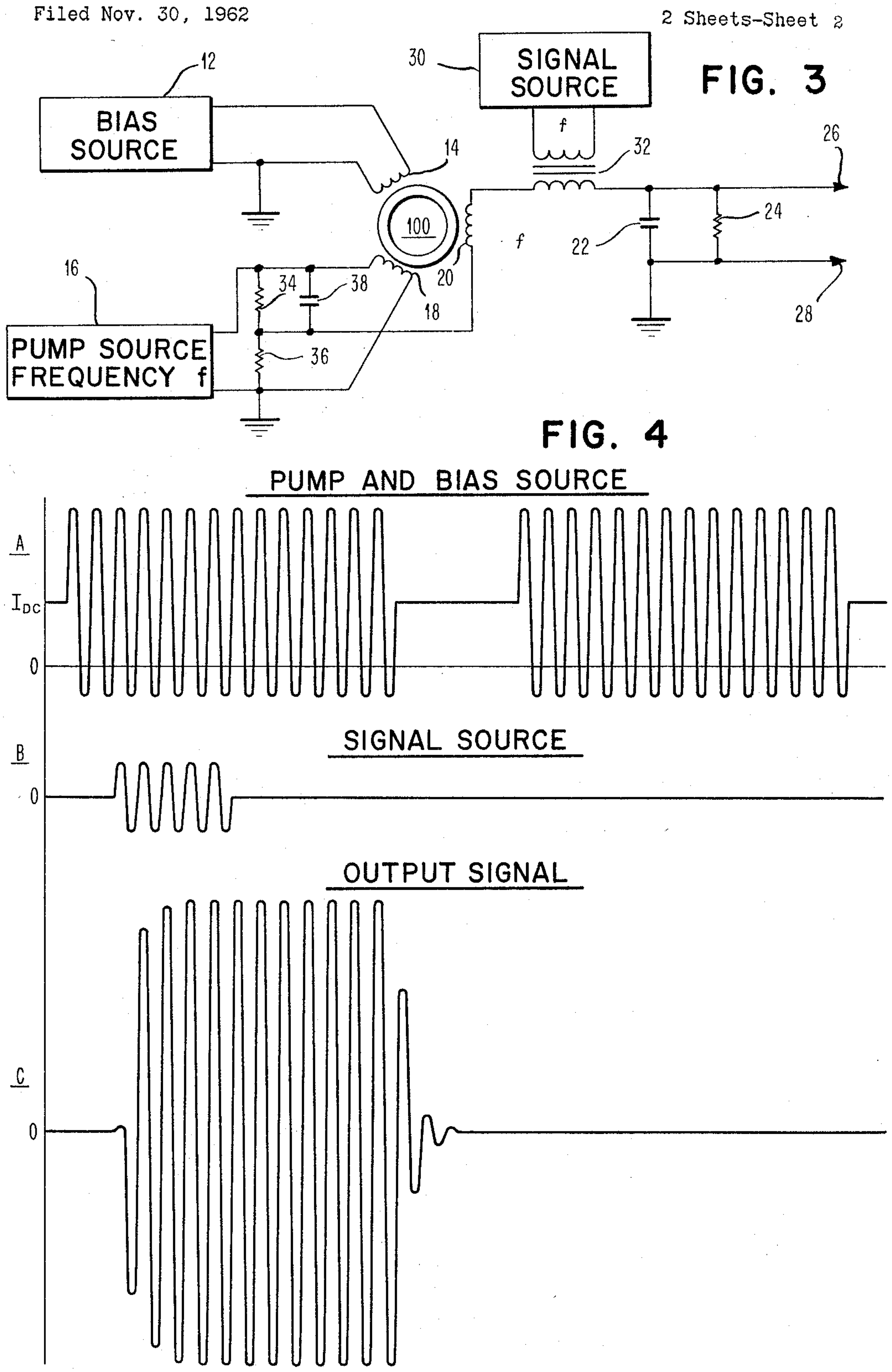
FIG. 3 is a schematic of another embodiment of this invention.

In another embodiment of this invention, a non-rectangular hysteresis characteristic type magnetically saturable element can be used. Referring to FIG. 3, element

100 has a non-rectangular hysteresis characteristic. Across the pump winding 18 are serially connected resistors 34, 36 with a capacitor 38 across the resistor 34. The junction of the capacitor 38 and the resistors 34, 36 is coupled to one terminal of the output winding 20. The other terminal of the output winding 20 is coupled through the parallel coupled capacitor 22 and load resistor 24 to a point of reference potential, such as ground. Other connections are made in the manner described with reference to FIG. 1.

The resistors 34, 36 and capacitor 38 act as a compensator circuit by providing a compensating signal of the same magnitude and of opposite phase as the signal induced into the output circuit due to the non-linearity of the magnetic element when the pump source is present, and no input signal is present at the signal source 30.

When an input signal is provided at the signal source 30, additional energy is provided to the circuit in excess of the compensating signal; oscillation in the tank circuit initiates and remains until the pump source is removed.

Other modifications wil be suggested to those skilled in the art without departing from the spirit and scope of this invention. For example the signal source 30 can be coupled to the output circuit by capacitive coupling; the bias source and pump source can use a common winding.

The embodiments of the invention in which an exclusive property or privilege is claimed are defined as follows:

1. In combination,
- a magnetically saturable element having saturating means and an output winding;
- a bias source coupled to said means;
- a pump frequency source having a frequency $f$ coupled to said means;
- a capacitor coupled to said output winding forming a circuit resonant at said frequency $f$; and
- a signal source having said frequency $f$ coupled to said circuit.

2. In combination,
- a magnetically saturable element having saturating means and an output winding,
  - said element having a hysteresis characteristic, the portion of the characteristic at saturation and its remanent states having a relatively low $d\phi/d(NI)$ ratio, other portions of the characteristic having relatively high $d\phi/d(NI)$ ratios;
- a bias source coupled to said means,
  - said bias source being sufficient to normally saturate said element to a bias condition, the $d\phi/d(NI)$ ratio at said condition being relatively low;
- a pump frequency source having a frequency $f$ coupled to said means,
  - said frequency source having an amplitude of such value that the element oscillates about said bias condition and remains in the relatively low $d\phi/d(NI)$ portion of said hysteresis characteristic;
- a capacitor coupled to said output winding forming a circuit resonant at said frequency $f$; and
- a signal source at said frequency $f$ coupled to said circuit,
  - said signal source being of such phase and magnitude to sum with said pump source to cause said element to operate at its relatively high $d\phi/d(NI)$ portion of its hysteresis characteristic;
- whereby oscillations take place in said circuit upon the coincidence of said pump source and said signal, and remain during the duration of said pump source and after the termination of said signal.

3. The combination as claimed in claim 2 wherein said element is a ferrite core.

4. The combination as claimed in claim 2 wherein said pump source is alternately turned on and off.

5. The combination as claimed in claim 2 wherein said element has a substantially rectangular hysteresis characteristic.

6. The combination as claimed in claim 2 wherein said element has a substantially non-rectangular hysteresis loop, and wherein said combination further comprises a cancellation circuit coupled between said pump source and said capacitor.

7. The combination as claimed in claim 2 wherein said saturating means includes a bias winding and a pump winding.

References Cited by the Examiner

UNITED STATES PATENTS

| | | | |
|---|---|---|---|
| 2,977,482 | 3/1961 | Sterzer | 307—88 |
| 2,999,167 | 9/1961 | Sterzer | 307—88 |
| 3,051,844 | 8/1962 | Beam et al. | 307—88 |
| 3,069,632 | 12/1962 | Sterzer | 307—88 |
| 3,084,335 | 4/1963 | Kosonocky et al. | 307—88 |

BERNARD KONICK, *Primary Examiner.*

G. LIEBERSTEIN, *Assistant Examiner.*